United States Patent [19]
Zamzow

[11] Patent Number: 6,039,995
[45] Date of Patent: Mar. 21, 2000

[54] METHOD OF MAKING PARTIALLY SPLIT SLICES OF BACON

[75] Inventor: Merle Zamzow, Loganville, Ga.

[73] Assignee: Hormel Foods, LLC, Austin, Minn.

[21] Appl. No.: 09/087,316

[22] Filed: May 29, 1998

[51] Int. Cl.[7] .................................................. A23P 1/00
[52] U.S. Cl. ........................ 426/518; 426/641; 426/73
[58] Field of Search ............................. 426/76, 513, 518, 426/641

[56] References Cited

U.S. PATENT DOCUMENTS

| | | | |
|---|---|---|---|
| 969,173 | 9/1910 | Loose | 426/76 |
| 1,604,764 | 10/1926 | Block | 426/513 |
| 1,745,013 | 1/1930 | Honohan | 426/513 |
| 1,836,604 | 12/1931 | Meyer | 426/6 |
| 2,228,414 | 1/1941 | Spang | 426/518 |
| 3,532,511 | 10/1970 | Binkerd et al. | 426/641 |
| 3,635,732 | 1/1972 | Bissett | 426/513 |
| 3,717,473 | 2/1973 | Bissett | 426/76 |
| 5,045,329 | 9/1991 | Goglanian | 426/106 |
| 5,069,914 | 12/1991 | Gagliardi, Jr. | 426/76 |

*Primary Examiner*—Nina Bhat
*Assistant Examiner*—Sherry A. Dauerman
*Attorney, Agent, or Firm*—Mau & Krull, P.A.

[57] ABSTRACT

A method of making partially split slices of bacon which includes partially splitting a belly by making a cut which extends from the belly's flank end to the belly's shoulder end on the belly's first side. The cut extends from the first side to proximate the belly's second side, wherein the belly is partially split. The belly is sliced to form a slice of bacon that is partially split, wherein the slice of bacon may later easily be split into two pieces.

13 Claims, 1 Drawing Sheet

METHOD OF MAKING PARTIALLY SPLIT SLICES OF BACON

BACKGROUND OF THE INVENTION

1. Field of the Invention

This invention relates generally to a method of making precooked bacon and more particularly to a method of making precooked bacon that is partially split.

2. Description of the Prior Art

Bacon is a very popular meat product that is used to top food items, especially sandwiches. For example, bacon is used in the preparation of cheeseburgers, club sandwiches, bacon and egg biscuits and bacon, lettuce and tomato sandwiches. Fast food and fast service operations often use half slices of precooked bacon to top the sandwiches that they have prepared. The sandwiches utilize bacon that has been cut in half and the halves are placed either side-by-side or crossed on top of the meat or biscuit. These operations used precooked bacon and, if it is necessary to size the bacon by cutting it in half, requires an extra operation or effort by the cook. The precooked bacon is not easily divided into two sections. Attempting to break the bacon with a mechanical force, such as simply bending the bacon, results in an uneven appearance where the bacon is split. If the precooked bacon is supplied in half sections already, it is then necessary to randomly match two half sections of bacon. This is not acceptable to many cooks.

The present invention addresses the problems associated with the prior art and provides for a complete slice of precooked bacon that is easily split into two sections.

SUMMARY OF THE INVENTION

The invention is a method of making a partially split slice of bacon. The method includes partially splitting a belly by making a cut, which extends from the belly's flank end to the belly's shoulder end on a first side. The cut extends from the first side to proximate the belly's second side, wherein the belly is partially split. The belly is then sliced to form a slice of bacon that is partially split, wherein the slice of bacon may be later easily split into two pieces. In a preferred embodiment, the cut is from ¼ to ⅛ inch of the skinned side. The method further includes precooking the slices of bacon and packaging the slices of bacon. The precooked split slice of bacon may then easily be broken by a non-slicing force into first and second sections.

DETAILED DESCRIPTION OF THE PREFERRED EMBODIMENT

Figure 2:
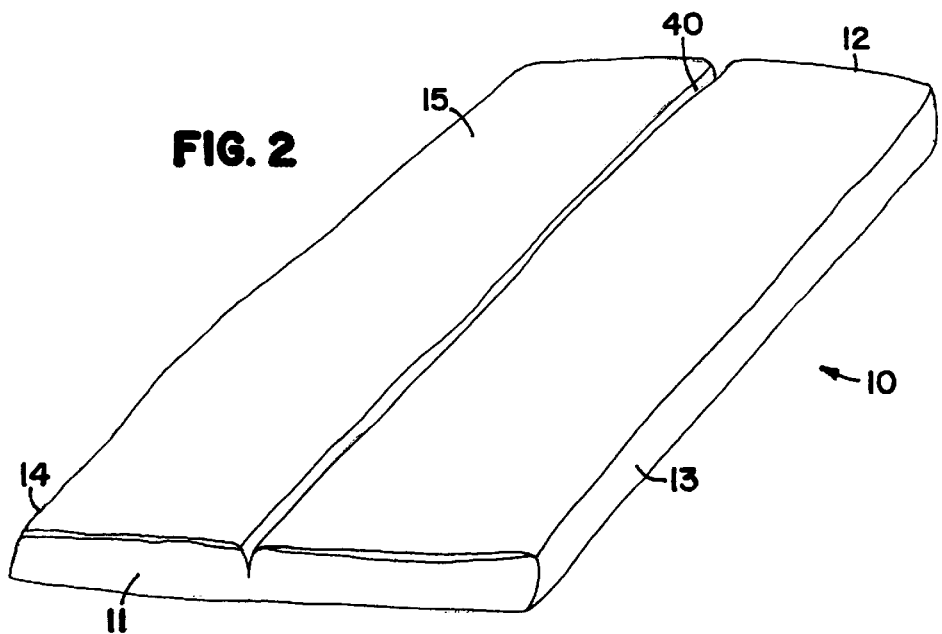
FIG. 2 is a perspective view of the pork belly shown in FIG. 1, viewing mainly the lean side.

Referring to the drawings, wherein like numerals represent like parts throughout the several views, there is generally designated at 10 a pork belly. The pork belly 10 has a shoulder end 11, flank end 12, first end 13 and a second end 14. The pork belly 10 also has a lean side 15 and a skinned side 16. As best seen in FIG. 2, in the making of a partially split slice of bacon 60, the belly 10 is cut down the center of the belly on the lean side 15. The cut 40 extends from the shoulder end 11 to the flank end 12. The depth of the cut 40 extends from the lean side to proximate the skinned side 16. However, as seen in FIG. 2, the cut 40 does not extend completely to the skinned side. If the cut did extend that far, the belly would be split in two. Instead, the cut comes proximate to the skinned side 16 and preferably ¼ to ⅛ inch away from the skinned side. This leaves a portion of the meat, under the cut 40, which holds the belly 10 together. Subsequently, after slicing, the same portion will hold the slice of bacon together. While the drawing and description has described the cut 40 as extending from the lean side to proximate the skinned side, it is understood the cut could also be made on the skinned side and extending proximate the lean side.

Figure 3:
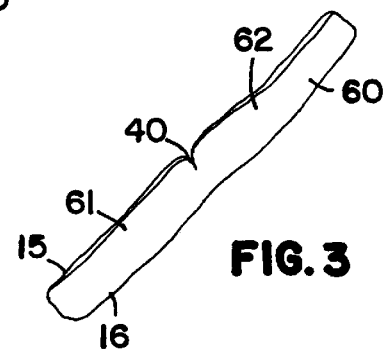
FIG. 3 is a perspective view of a slice of bacon after it has been sliced from the belly shown in FIG. 1.
Figure 1:
FIG. 1 is a perspective view of a pork belly viewing mainly the skinned side of the belly.

The partially split belly is then fed to a suitable slicer such as a Grote slicer. The belly is sliced from the first end 13 to the second end 14 thereby forming a partially split slice of bacon 60, as best seem in FIG. 3. The partially split slice of bacon 60 has an overall length which would be comparable to a normally produced slice of bacon. However, the split slice of bacon 60 has the cut 40 proximate and center to partially divide the slice of bacon 60 into a first section 61 and a second section 62.

The partially split slices of bacon 60 are then precooked and packaged by means well known in the art. Examples of this are described in U.S. Pat. No. 3,906,115 issued Sep. 16, 1975 to Jeppson and U.S. Pat. No. 5,132,126 issued Jul. 21, 1992 to Sinkler et al. The packaging may take a number of forms and any suitable method, well known in the art, may be utilized. Because the slices have been precooked, they are readily available to be used directly in the numerous applications previously described. If the partially split slices of bacon 60 are to be used without heating, the cook would simply take the slice of bacon 60 and bend it, thereby breaking the bacon slice 60 into the first section 61 and second section 62. The bacon 60 splits easily along the cut 40. A typical slice of bacon does not break easily as does the present invention with the partially split formed by the cut 40. The cook simply needs to apply a non-slicing force to the bacon 60 to break it into two pieces. By a non-slicing force, it is meant that the force is a breaking mechanical force and not one caused by a knife or other cutting instrument. While such an instrument may be used, it is not necessary because of the partially split nature of the bacon 60. The bacon 60 may be placed on top of the sandwiches directly without heating or the bacon 60 may be used after heating. In any event, the bacon 60 is split into two sections 61 and 62 so that two ½ sections of a full slice of bacon may be used in a sandwich rather than two random halves, as was typical in the prior art.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of making a partially split slice of bacon, comprising:

a) partially splitting a belly by making a cut, which extends from the belly's flank end to the belly's shoulder end, on the belly's first side, the cut extending from the first side to proximate the belly's second side, wherein the belly is partially split; and b) slicing the belly to form a slice of bacon that is partially split, wherein the slice of bacon may be later easily split into two pieces.

2. The method of claim 1, wherein the first side is a lean side and the second side is a skinned side.

3. The method of claim 1, wherein the first side is a skinned side and the second side is a lean side.

4. The method of claim 1, wherein the cut is from ¼ to ⅛ inch of the second side.

5. The method of claim 1, further comprising precooking the sliced bacon.

6. The method of claim 5, further comprising packaging the sliced bacon.

7. The method of claim 6, wherein a cook separates the partially split sliced bacon into first and second sections by application of a non-slicing force.

8. The method of claim 1, wherein the cut is at the belly's center.

9. A method of making a partially split slice of bacon, comprising:

a) partially splitting a belly by making a cut, which extends from the belly's flank end to the belly's shoulder end, on the belly's first side, the cut extending from the first side to proximate the belly's second side, wherein the belly is partially split;

b) slicing the belly to form a slice of bacon that is partially split, wherein the slice of bacon may be later easily split into two pieces;

c) precooking the slices of bacon; and d) packaging the slices of bacon, wherein a cook separates the partially split slice of bacon into first and second sections by application of a non-slicing force.

10. The method of claim 9, wherein the cut is from ¼ to ⅛ inch of the second side.

11. The method of claim 10, wherein the cut is at the belly's center.

12. The method of claim 11, wherein the first side is a lean side and the second side is a skinned side.

13. The method of claim 11, wherein the first side is a skinned side and the second side is a lean side.

* * * * *